(12) United States Patent
Vennegeerts et al.

(10) Patent No.: US 10,495,456 B2
(45) Date of Patent: Dec. 3, 2019

(54) METHOD FOR CALIBRATING A DETECTION DEVICE, AND DETECTION DEVICE

(71) Applicant: p3d systems GmbH, Hamburg (DE)

(72) Inventors: Harald Vennegeerts, Hannover (DE); Christian Hesse, Buxtehude (DE); Erwin A. Frei, Zurich (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1080 days.

(21) Appl. No.: 14/249,666

(22) Filed: Apr. 10, 2014

(65) Prior Publication Data
US 2014/0309960 A1 Oct. 16, 2014

(30) Foreign Application Priority Data

Apr. 12, 2013 (EP) ..................................... 13163507
Oct. 1, 2013 (EP) ..................................... 13186896

(51) Int. Cl.
*G01B 21/16* (2006.01)
(52) U.S. Cl.
CPC ................................... *G01B 21/16* (2013.01)
(58) Field of Classification Search
CPC ........ G01B 21/16; G01C 7/00; G01C 15/022; G01C 25/00
See application file for complete search history.

(56) References Cited

U.S. PATENT DOCUMENTS

| 6,349,249 | B1 * | 2/2002 | Cunningham | .......... E21D 9/004 |
| | | | | 180/116 |
| 7,187,401 | B2 | 3/2007 | Alhadef | |
| 7,453,553 | B2 * | 11/2008 | Dimsdale | .............. G01S 7/4865 |
| | | | | 356/5.1 |
| 7,697,748 | B2 * | 4/2010 | Dimsdale | ............... G01C 11/06 |
| | | | | 348/169 |
| 2003/0123045 | A1 * | 7/2003 | Riegl | ................... G01C 15/002 |
| | | | | 356/4.01 |
| 2003/0202089 | A1 | 10/2003 | Alhadef | |

(Continued)

FOREIGN PATENT DOCUMENTS

DE 102009040468 A1 3/2011
EP 2 570 769 A1 3/2013

*Primary Examiner* — John E Breene
*Assistant Examiner* — Jeffrey C Morgan
(74) *Attorney, Agent, or Firm* — Davis & Bujold PLLC; Michael J. Bujold

(57) ABSTRACT

A device designed for the three-dimensional geometrical detection of an environment includes at least one inertial measurement system for provisionally calculating a trajectory of the detection device. The device is calibrated by steps of: (a) positioning and/or orienting the detection device in a position and/or orientation with respect to at least one reference point characterized by at least one predefined relative coordinate, or determining at least one relative coordinate which characterizes the position and/or the orientation of the detection device relative to at least one reference point; (b) determining at least one error variable which characterizes the deviation of the relative coordinate in accordance with step (a) from the relative coordinate(s) provisionally calculated by the inertial measurement system; and (c) if the error variable fulfills a predefined correction criterion, correcting the provisional trajectory.

17 Claims, 10 Drawing Sheets

(56) References Cited

U.S. PATENT DOCUMENTS

| | | | |
|---|---|---|---|
| 2009/0220145 A1* | 9/2009 | Ootani | G01C 11/00 |
| | | | 382/154 |
| 2009/0262974 A1 | 10/2009 | Lithopoulous | |
| 2013/0029685 A1 | 1/2013 | Moshfeghi | |
| 2013/0128284 A1* | 5/2013 | Steffey | G01B 11/002 |
| | | | 356/623 |
| 2014/0350886 A1 | 11/2014 | Metzler | |

* cited by examiner

METHOD FOR CALIBRATING A DETECTION DEVICE, AND DETECTION DEVICE

BACKGROUND OF THE INVENTION

The present invention relates to a method for calibrating a detection device which is designed for the three-dimensional geometrical detection of an environment and which comprises at least one inertial measurement system for computationally determining a trajectory of the detection device. In addition, the invention also relates to a detection device designed for performing such a method.

A detection device of the generic type is described in DE 10 2009 040 468 A1, for example. Said detection device comprises a laser scanner, with the aid of which an environment can be detected three-dimensionally. The environment can be, for example, an industrial installation or a production facility. In order that the environment can be imaged correctly and precisely from the data detected by means of the laser scanner, it is obviously of great importance for the position and the orientation of the detection device to be known as accurately as possible at every point in time of measurement. Here and hereinafter, the position of the detection device is understood to mean the location of a fixed referential point of the detection device; the orientation indicates the orientation of the axes of an imaginary, intrinsic coordinate system of the detection device. The referential point of the detection device can be, for example, the coordinate origin of the imaginary, intrinsic, coordinate system of the detection device. Therefore, position and orientation have in each case three mutually independent and in total six mutually independent degrees of freedom.

In many cases, GPS signals or other global navigation signals can be used for determining position and orientation of the detection device. However, such signals cannot be received in just any environment, for example in shielded buildings. For this purpose, the known detection devices (for example that described in DE 10 2009 040 468 A1) comprise an inertial measurement system, with the aid of which it is possible to determine the accelerations in three translation directions and three rotation directions. If initial position, initial orientation, initial velocity and initial angular velocity are known, then the position and the orientation of the detection device can be determined therefrom in principle by double temporal integration at any later point in time, even without GPS or other navigation signals being available.

On account of mechanical and computational inaccuracies, however, only an approximate determination of position and orientation is possible. Over time, deviations (a so-called drift) occur between the position and orientation determined with the aid of the inertial measurement system and the actual position and orientation. Without countermeasures, the three-dimensional imaging of the environment also becomes more and more inaccurate over time as a result.

SUMMARY OF THE INVENTION

Therefore, it is an object of the present invention to provide a method and a detection device with which these disadvantages from the prior art are overcome. In particular, the intention is to make it possible to determine the position and/or orientation of the detection device as precisely as possible over the longest possible period of time, specifically even without GPS or other navigation signals being available.

This object is achieved firstly by means of a method according to the invention for calibrating a detection device. The detection device is designed for the three-dimensional geometrical detection of an environment and comprises at least one inertial measurement system for provisionally computationally determining a trajectory of the detection device. Inertial measurement systems per se are known to the person skilled in the art and therefore do not need any further explanation here. The trajectory is understood to mean the information about the position and the orientation of the detection device relative to the environment, specifically depending on time.

The method according to the invention comprises the following steps:

a) i) positioning and/or orienting the detection device in a relative position and/or relative orientation with respect to at least one reference point which is characterized by at least one predefined relative coordinate,
or
ii) determining at least one relative coordinate which characterizes the relative position and/or the relative orientation of the detection device with respect to at least one reference point;

b) determining at least one error variable which characterizes the deviation of the at least one relative coordinate in accordance with step a) from the relative coordinate(s) provisionally computationally determined by the inertial measurement system;

c) if the error variable fulfils a predefined correction criterion: correcting the trajectory provisionally computationally determined by the inertial measurement system.

For the three-dimensional geometrical detection of an environment, the detection device can comprise for example a laser scanner known per se, such as is described for example in DE 10 2009 040 468 A1.

The at least one reference point is preferably stationary in relation to the environment; that is to say that it does not move relative to the environment. However, it is also entirely conceivable and within the scope of the invention for the position of the reference point relative to the environment to change with respect to time, provided that this position is known at every point in time of the method.

The reference point can be, for example, a marking discernible to the naked eye. Such a marking can be applied, for instance, on a floor or on a wall of a production facility, on structural and/or decorative elements of buildings, on machines and installations or on other devices. One, a plurality or all of the reference points can be indexed, that is to say identified for example by a unique numbering and/or a unique coding. However, the invention also allows the situation that none of the reference points need bear such an indexing, with the result that in particular all of the reference points can be identical to one another and differ from one another only in their position, as will also be explained in detail further below.

The relative coordinate can be, for example, the distance between a fixed referential point of the detection device and the reference point. Alternatively, the relative coordinate can be the distance between the referential point of the detection device and a straight line defined by two mutually different reference points. In a further possibility, the relative coordinate can be the distance between the referential point of the detection device and a plane defined by three non-collinear reference points. A set of two relative coordinates can for example also comprise or consist of two Cartesian coordinates. These two Cartesian coordinates can specify the relative location of the vertical projections of the referential point of the detection device and of the reference point onto a horizontal plane. If, by way of example, the vertical projection of the reference point on the horizontal plane is chosen as the origin of the Cartesian coordinate system, then the two Cartesian coordinates are equal to zero exactly when the referential point of the detection device is situated exactly vertically above or exactly vertically below the reference point. However, the relative coordinate can also be an angle in a triangle defined by the referential point of the detection device and two different reference points.

In a first variant i) of step a), firstly at least one relative coordinate is predefined, and the detection device is positioned and/or oriented in such a way that this predefined relative coordinate is adopted. In the second variant ii) of step a), the relative coordinate is not predefined, but rather is determined by a measurement.

In accordance with step b), an error variable is determined which characterizes the deviation of the at least one relative coordinate that is predefined or is determined by measurement from the relative coordinate(s) provisionally computationally determined by the inertial measurement system. The error variable can be, for example, the absolute value of the difference between a relative coordinate that is predefined or is determined by measurement and a relative coordinate provisionally computationally determined by the inertial measurement system. In the case of a plurality of relative coordinates, by way of example, the sum of the absolute values of the individual differences can be chosen.

Determining the error variable in step b) can be effected for example with the aid of a computational filter, such as, for instance, with the aid of a Kalman filter.

The positioning and/or orienting in accordance with step a) i), determining the relative coordinate in accordance with step a) ii) and determining the error variable in accordance with step b) can be carried out for one, a plurality or all of the reference points.

If the individual reference points are indexed and it is known in the vicinity of which reference point the detection device is situated at a specific point in time, then it can be sufficient for the steps mentioned to be carried out at this point in time only for this one reference point. The detection device can be notified manually (for example via an interface) in the vicinity of which reference point the detection device is situated. Alternatively or additionally, however, the detection device can also comprise image recognition means which can be used to recognize in the vicinity of which reference point said detection device is situated.

However, it is not mandatory for the reference points to be indexed or for image recognition of reference points to be necessary. By way of example, a plurality or all of the reference points can be formed by identical markings in an environment. In this case, determining the relative coordinate in accordance with step a) ii) and determining the error variable in accordance with step b) can be carried out simultaneously for a plurality or all of the reference points. The trajectory provisionally computationally determined by the inertial measurement system can then be corrected in step c) in such a way that the provisionally computationally determined position and/or orientation of the detection device at this point in time are/is replaced by the position and/or orientation corresponding to the reference point for which the error variable determined in step b) is the smallest. In other words, it is not necessary to know from the outset in the vicinity of which of a multiplicity of reference points the detection device is situated.

If the error variable mentioned fulfils a predefined correction criterion, the trajectory provisionally computationally determined by the inertial measurement system is corrected in step c).

In a first variant, the correction criterion can be that a predefined threshold value is exceeded. In this case, the threshold value can be chosen such that a correction is always effected if a deviation is ascertained in step b); in this regard, by way of example (as described above), the error variable can be defined by the absolute value of the difference and zero can be chosen as the threshold value. Particularly preferably, for the purpose of correcting in accordance with step c), the provisionally computationally determined position and/or orientation are/is replaced by the position and/or orientation resulting from the relative coordinate predefined in step a) i) or the relative coordinate determined in step a) ii).

In a second variant, the correction criterion can be a predefined statistical criterion. By way of example, the statistical criterion can demand that a standard deviation of a variable determined by the inertial measurement system does not exceed a predefined threshold value. The variable determined by the inertial measurement system can be, for instance, at least one coordinate which characterizes the position and/or the orientation of the detection device. The standard deviation is then the error variable and can be estimated by the detection device, in particular by the inertial measurement system, by means of a predefined algorithm. The algorithms for error estimations that are known per se to the person skilled in the art can be used for this purpose.

Furthermore, in a third variant, the correction criterion can also simply be a zero criterion; this means that the trajectory provisionally computationally determined by the inertial measurement system is corrected in any case and independently of the error variable.

The method according to the invention therefore allows the recalibration of the trajectory provisionally computationally determined by the inertial measurement system. The deviations occurring over time that are present in the prior art can be at least reduced as a result. Thus, a precise detection of the environment is also possible over a relatively long period of time if method steps a) to c) are carried out at certain time intervals, specifically even when neither a GPS nor any other global navigation signal is available. Particularly in contrast to the teaching of DE 10 2009 040 468 A1, according to which firstly the detection device is moved (freely) within an environment (comprising intersection points, rectilinearity of edges, etc.) and it is only afterwards that navigation information from the environment or external navigation systems is integrated, the method according to the invention from the outset allows a controlled movement of the detection device within the environment and subsequent use of this information about the movement behavior as navigation information. Independence from the environment and navigation signals can be achieved as a result.

Preferably, determining the error variable in step b) is effected at a point in time of rest at which the detection device rests or at least substantially rests, i.e. at a point in time at which the linear velocity and the angular velocity of said detection device are zero or at least below predefined threshold values. At such a point in time of rest, the error variable can be determined particularly precisely in step b).

In a first variant, a point in time of rest can be determined with the aid of the inertial measurement system as a point in time at which the velocity and angular velocity calculated by the inertial measurement system or computational combinations thereof are zero or at least below predefined threshold values.

In a second variant, a user can manually notify the detection device if said user has brought the detection device to rest (in so far as this is possible for said user). The input can be effected, in particular, via an interface of the detection device.

A third variant provides for one, a plurality or all of the components of the velocity and/or the angular velocity to be determined with the aid of further components of the detection device. By way of example, the detection device can be embodied as a vehicle comprising one or more wheels, wherein a velocity component of the vehicle can be determined with the aid of a wheel sensor arranged on a wheel. In particular, a point in time of rest is present when the vehicle is at a standstill determined with the aid of such a wheel sensor. A wheel sensor can, of course, also be used to correct the velocity calculated by the inertial measurement system at a point in time at which the vehicle does not rest.

In all three variants described above, the trajectory calculated by the inertial measurement system can be corrected at a point in time of rest in such a way that the calculated velocity at this point in time is set to zero (so-called "zero velocity update", ZUPT). This "zero velocity update" can be used as an indication for performing a correction in accordance with step c).

Method steps a), b) and c) can each be performed singly or else multiply in succession. In one variant, it is possible for step a) firstly to be repeated multiply for the same or different relative coordinates, without step b) or c) being performed between the individual repetitions of step a). It is only after the last repetition of step a) that determining the error variable in accordance with step b) and correcting in accordance with step c) can be effected for all preceding repetitions of step a). In this variant, therefore, the correction of the entire trajectory is carried out only at the end of the method. Alternatively or additionally, it is also possible for step b) to be carried out multiply in succession, in particular multiply in succession for one and the same relative coordinate or multiply in succession for a plurality or all of the relative coordinates.

In a different variant, steps a) and b) can be carried out multiply in succession. By way of example, this can involve firstly carrying out a first positioning, then determining the error variable for this first position, subsequently carrying out a second positioning, then determining the error variable for this second position, and it is only at the end that the correction for the entire trajectory is carried out in accordance with step c).

Finally, it is also conceivable that determining the error variable in accordance with step b) and correcting in accordance with step c) are effected directly afterwards for each positioning in accordance with step a).

In one possible embodiment, the positioning and/or orienting in step a) i) are/is effected by means of a mechanical contact of a contact point of the detection device with a reference point. The arrangement of the contact point then determines the distance between a referential point of the detection device and the reference point, and said distance can be the predefined relative coordinate. A positioning and/or orienting by means of a mechanical contact is particularly precise and moreover robust. It is conceivable for the contact point to be at a variably adjustable distance from the referential point. In this regard, by way of example, the contact point can be the end of an extensible rod. A scale can be provided, from which the distance between the contact point and the referential point or a variable associated therewith can be read off. The detection device can have an interface via which the user can input the distance or the variable associated therewith. Alternatively, the detection device can also be embodied in such a way that it can directly measure the distance and use it when determining the error variable in step b).

Alternatively or additionally for the purpose of positioning and/or orienting in step a) i), a light beam, in particular a laser beam, emitted by the detection device can be directed onto the reference point. This allows a contactless and nevertheless precise positioning and/or orienting by means of the user aligning the laser beam by corresponding movement of the detection device.

Alternatively or additionally, for the purpose of positioning and/or orienting in step a) i), a camera can be used which is directed at the reference point. By way of example, a CCD camera known per se can be involved. The camera can be directed downwards for example relative to a vertical axis of an imaginary, intrinsic coordinate system of the detection device. In this way, images of a floor, for example a floor of a production facility, can be captured with the aid of the camera. Said images can be represented on a screen. A point corresponding to the intrinsic vertical axis can additionally be superimposed on the screen. This allows a particularly simple positioning for the user by bringing the reference point to correspondence with the inserted point.

The detection device can also comprise an image processing device connected to the camera. By way of example, the distance between an intrinsic vertical axis of the detection device and one or more reference points can be determined with the aid of such an image processing device. This allows further error corrections if the detection device is not positioned and/or oriented exactly in accordance with the predefined relative coordinate(s).

The positioning in accordance with step a) ii) can be effected, for example, by the detection device being positioned exactly vertically above a reference point. In this case, two relative coordinates, which specify the relative location of the vertical projections of the referential point of the detection device and of the reference point onto a horizontal plane, are equal to zero. As an alternative thereto, the detection device need not necessarily be positioned exactly vertically above a reference point; instead, with the aid of the inertial measurement system and/or at least one inclination sensor, an orientation of the detection device can be determined and correspondingly taken into account computationally in the process of determining the error variable in step b).

Determining at least one (non-predefined) relative coordinate in step a) ii) can be effected optically. By way of example, this can be done with the aid of at least one laser distance measuring device. Such laser distance measuring devices known per se enable a particularly precise measurement of a distance, in particular of a vertical or a horizontal distance between a referential point of the detection device and a reference point. The detection device can also comprise a plurality of laser distance measuring devices aligned in different directions. By way of example, a first laser distance measuring device can be aligned in a first horizontal direction and a second laser distance measuring device can be aligned in a second, opposite horizontal direction. In this case, a horizontal direction is understood as a direction running perpendicularly to an intrinsic vertical axis of the detection device.

Alternatively or additionally, it is also possible that the environment to be detected comprises at least one laser distance measuring device which can be used to determine a distance between the detection device and the laser distance measuring device. In order to support this, the detection device can comprise at least one reflector with the aid of which a laser beam emitted by the laser distance measuring device can be reflected back to the latter.

Alternatively or additionally, the detection device can comprise at least one retroreflector, that is to say a reflector which reflects incident radiation largely independently of the alignment of the reflector for the most part in the direction back to the radiation source. Such retroreflectors are known per se and can be embodied, for example, as triple mirrors or triple prisms. However, so-called round prisms, which are likewise known per se, are particularly preferred in the context of the invention. Such a round prism allows, in a horizontal location, electro-optical signals from arbitrary horizontal spatial directions to be reflected centrally.

The position of a detection device comprising a retroreflector can be determined with the aid of a tachymeter that is likewise known per se, in particular with the aid of a target-acquiring or even target-tracking tachymeter. For this purpose, the tachymeter can emit a light beam that is reflected back to the tachymeter by the retroreflector, in particular by the round prism, of the detection device. At least one relative coordinate of the retroreflector can thereby be determined in a manner known per se. At least one relative coordinate of the detection device which characterizes the position and/or orientation thereof can be determined indirectly in this way in step a) ii) of the method according to the invention. On the basis of this determination, the trajectory provisionally computationally determined by the inertial measurement system can then be corrected, if appropriate, in step c).

In order that the error variable can be determined correctly in step b), the relative coordinate(s) provisionally determined by the inertial measurement system must be determined for the same point in time at which the detection device was positioned and/or oriented in step a) i) or at which the at least one relative coordinate was determined in step a) ii). For this purpose, the point in time of carrying out step a) i) or a) ii) can be determined and fixed along an absolute timescale. The relative coordinate(s) provisionally determined by the inertial measurement system is (are) then determined at this point in time that is measured along the same absolute timescale. If appropriate, the timescales for positioning and/or orienting the detection device in step a) i) or for determining the at least one relative coordinate in step a) ii), on the one hand, and for the provisional computational determination, on the other hand, can be synchronized with one another.

However, it is also possible to dispense with such an absolute timescale and a synchronization. For this purpose, in a plurality of successive steps a) ii), firstly respective relative coordinates can be determined—for example at points in time of rest of the detection device as described above and/or with the aid of a tachymeter and a retroreflector. However, these points in time need not necessarily be determined or fixed along an absolute timescale. Instead, the distance between the coordinate(s) provisionally computationally determined by the inertial measurement system and the relative coordinates determined in steps a) ii) can be ascertained for each point in time of rest. The correction in step c) is then effected on the basis of those relative coordinates for which said distance is the smallest.

In some embodiments, at least one absolute coordinate of at least one reference point is known, and said at least one absolute coordinate is used when determining the error variable in step b). In this case, absolute coordinate of a reference point is understood to mean a coordinate which characterizes the position of said reference point within the environment to be detected. By way of example, this can involve one or a plurality of Cartesian coordinates of the reference point which are positionally fixed in relation to the environment. The absolute coordinate can be input for example by the user via an interface of the detection device.

Alternatively or additionally, at least one relative coordinate which characterizes the relative position and/or the relative orientation of at least two reference points with respect to one another can be known. In this regard, by way of example, the distance between two reference points can be known. The relative coordinate can also be an angle of a triangle whose three vertices are formed by respectively one of three reference points.

Known relative coordinates which characterize the relative position and/or the relative orientation of at least two reference points with respect to one another can be used as follows: firstly, the detection device can be positioned in accordance with a first predefined relative coordinate—for example exactly vertically above a first reference point. Subsequently, the detection device can be positioned in accordance with a second predefined relative coordinate—for example exactly vertically above a second reference point. During the movement from the first reference point to the second reference point, the distance between these two reference points is determined with the aid of the inertial measurement system. If this distance computationally determined with the aid of the inertial measurement system does not correspond to the actual distance, then the provisionally computationally determined trajectory is corrected.

In the context of the invention, however, it is not mandatory for absolute coordinates of the reference points or relative coordinates which characterize the relative position and/or the relative orientation of two reference points with respect to one another to be known. Specifically, in some possible embodiments, step a) i) can be carried out multiply in succession for one and the same reference point. If the detection device is brought to the same position and orientation at two different points in time, but the provisional computational determination by the inertial measurement system produces different positions and/or orientations, then this can likewise be used for correcting in step c). In the embodiment described here, it is also not necessary for the reference point to be a permanent marking or for its absolute coordinates to be known. By way of example, it is conceivable for the reference point to be a temporary marking, for instance in the form of an adhesive label, which is fixed to a point in the environment at the beginning of the method and can be removed again after the end of the method.

Alternatively, a plurality of reference points can be defined by predefined points of a pattern of a floor covering in the environment. If the distance between two reference points of the pattern is known, then said distance can be used in step b) for determining an error variable. If, by way of example, a periodic pattern having a known period length is involved, as is the case for instance for a tiled floor, then it is possible to use two points of the pattern as reference points whose distance is a known integral multiple of said period length. A plurality of reference points can also be arranged exactly vertically one above another. This can be utilized in a building, for example, about which it is already known that a plurality of storeys lying one above another with known storey height have identical floor plans. In these examples, too, the knowledge of absolute coordinates of the reference points is not absolutely necessary.

In advantageous embodiments, at least three, preferably at least five, different reference points lie on a common reference line segment. In accordance with the customary definition, here as well a line segment is always understood as a straight line. It is particularly preferred if the distances between the reference points lying on a common reference line segment are known.

The reference line segments can be horizontal and also vertical and also inclined. Horizontal reference line segments can be present for example on a floor of a fabrication facility. Vertical reference line segments are conceivable for instance on walls of a fabrication facility. A vertical reference line segment can also be formed for instance by a plurality of reference points which are arranged vertically one above another and which are situated for example in a plurality of storeys arranged one above another. An inclined reference line segment can be defined by the leading edges of a plurality of steps of a staircase, wherein points of the leading edge form reference points.

It is likewise conceivable and lies within the scope of the invention that a first subset of at least three reference points lies on a first common reference line segment and a second subset of further at least three reference points lies on a second common reference line segment, wherein the first and second reference line segments need not be parallel to one another.

At least one of the reference line segments can be defined by a reference laser beam. The reference laser beam can run horizontally, vertically or in an inclined fashion. The Cartesian coordinates of the projection of a referential point of the detection device onto a plane running perpendicularly to the reference laser beam are particularly suitable as relative coordinates.

The reference laser beam can be emitted by a laser that is fixedly mounted (for example on a wall or a ceiling of a production facility). However, the laser can also be portable and installed at the beginning of the method and deinstalled again after the end of the method. A visible reference laser beam is preferably involved. It goes without saying that a plurality of reference laser beams are also possible, the latter each defining a reference line segment. The reference laser beams need not necessarily be parallel to one another, that is to say also need not define reference line segments parallel to one another.

The reference laser beam can be detected with the aid of a laser detector, which can be part of the detection device. The laser detector can be a 360° laser detector; such a laser detector can detect laser beams which impinge on it from a 360° complete circle. The relative position and/or orientation of the detection device with respect to the reference laser beam can then be determined on the basis of the detection of the reference laser beam. By way of example, the distance between the reference laser beam and an intrinsic vertical axis of the detection device can be determined. Alternatively or additionally, with the aid of the laser detector it is possible to determine that point of the intrinsic vertical axis of the detection device on which the reference laser beam impinges.

The data ascertained by means of the laser detector can be time-marked, stored and processed further immediately or later. Optionally, the detection device can output an optical signal and/or an acoustic signal if the reference laser beam impinges on the laser detector in a predefined position or in a predefined range of possible positions.

As an alternative or in addition to a laser detector, the detection device can also comprise at least one reflector. If a reference laser beam impinges on such a reflector, then this can easily be recognized by the user.

In one variant of the invention, a plurality of reference points lie on a predefined trajectory. This trajectory can comprise one or a plurality of rectilinear reference line segments, wherein a plurality of reference line segments of the trajectory need not necessarily be parallel. The detection device can be moved along the predefined trajectory. The user can input via a corresponding interface, for example, the fact that said user moves the detection device firstly along a first reference line segment, running from one reference point to a second reference point, subsequently moves the detection device on a non-defined path to a third reference point and subsequently moves it along a reference line segment running from said third reference point to a fourth reference point. As a result of a comparison of the information input by means of the interface that the detection device was moved successively along two reference line segments, and on the basis of the provisional trajectory determined by the inertial measurement system, corresponding corrections to the trajectory can then once again be performed. In one advantageous variant, in this exemplary embodiment, too, the reference line segments can be defined by one or a plurality of reference laser beams.

As has already been explained in the introduction, the measurement inaccuracy of the inertial measurement system increases over time as long as no calibration is effected. With the aim of detecting the environment as accurately as possible, a calibration in accordance with the method according to the invention should be carried out at certain time intervals. In order to remind the user of this, the detection device can output a warning message if the time that has elapsed since the last calibration exceeds a predefined warning interval. The warning message can be output optically and/or acoustically.

A further aspect of the invention relates to a detection device for the three-dimensional geometrical detection of an environment, wherein the detection device comprises at least one inertial measurement system for provisionally computationally determining a trajectory of the detection device. According to the invention, the detection device furthermore comprises computation means designed in such a way as to carry out a method as described above. With such a detection device, therefore, it is possible to carry out the method described above with the advantages respectively described there.

The detection device can comprise positioning and/or orienting means for positioning and/or orienting the detection device in a relative position and/or relative orientation with respect to at least one reference point, wherein the relative position and/or relative orientation are/is characterized by at least one predefined relative coordinate. The positioning and/or orienting means can comprise, for example, at least one contact point as described above, which can be brought into contact with at least one reference point. The positioning and/or orienting means can be a laser, for example, which can emit a laser beam that can be directed onto a reference point. The positioning and/or orienting means can also comprise optical detection means for determining at least one relative coordinate, such as at least one camera, for example, which can be directed at a reference point.

Alternatively or additionally, the detection device can comprise, in particular, optical determining means for determining at least one relative coordinate which characterizes the relative position and/or the relative orientation of the detection device with respect to at least one reference point.

The determining means can be embodied as laser distance measuring devices, for instance.

However, it is also conceivable and lies within the scope of the invention that the detection device comprises neither positioning and/or orienting means as described above, nor determining means as described above. By way of example, the detection device can also be positioned and/or oriented in a desired manner simply by means of the user's assessment by eye. Determining at least one relative coordinate in accordance with step a) ii), can also be effected by means of a separate measuring instrument, for example, which is not part of the detection device.

For supplementary calibration, the detection device can also comprise even further components known per se, such as are described for instance in DE 10 2009 040 468 A1 (inter alia one or more magnetic field probes which can be used for ascertaining azimuth changes; and/or at least one, preferably at least two high-resolution inclination sensors which are arranged crosswise and which can ascertain pivotings from a horizontal plane; and/or at least one receiver for a global navigation signal for use in environments in which such a signal is available).

The detection device can be embodied as a portable instrument. It can be fixed to a human body with the aid of carrying devices. Even environments which cannot usually be reached by vehicles become accessible as a result. Relative movements between carrying device and detection device can be compensated for with the aid of an additional damping device. In this regard, reference is made again to DE 10 2009 040 468 A1. Alternatively, however, it is also possible and lies within the scope of the invention for the detection device to be embodied as a vehicle.

BRIEF DESCRIPTION OF THE DRAWINGS

The invention is explained in detail below on the basis of a plurality of exemplary embodiments. In the figures.

DETAILED DESCRIPTION OF THE INVENTION

Figure 1:
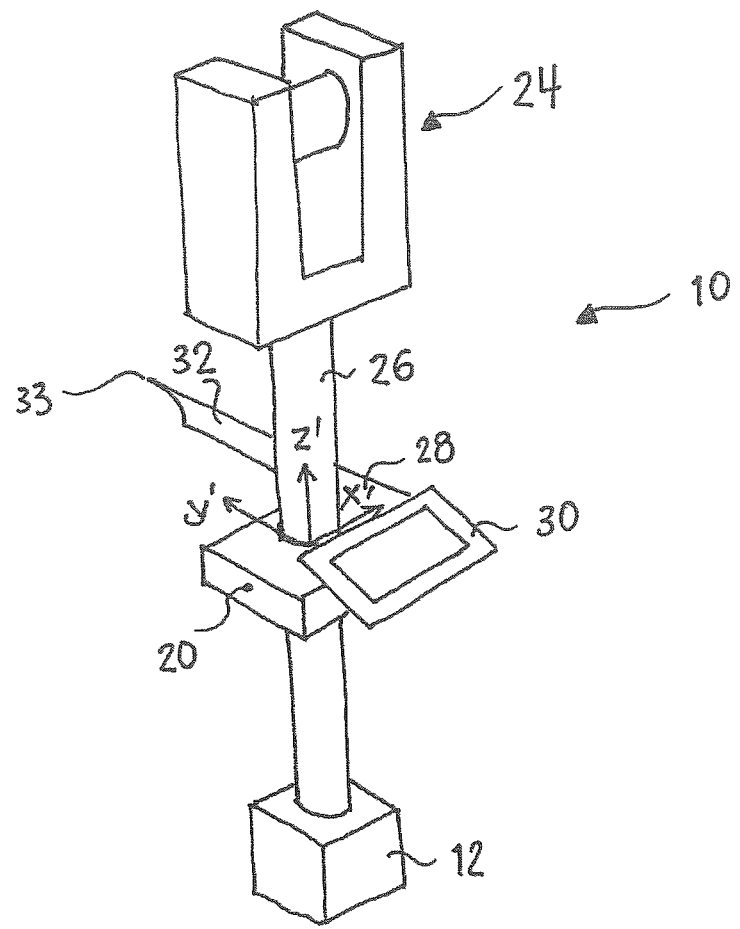
FIG. 1 shows a first embodiment of a detection device according to the invention.

FIG. 1 shows a first embodiment of a portable detection device 10 according to the invention. The detection device 10 comprises an imaginary fixed referential point 34, which forms the coordinate origin of a likewise imaginary, intrinsic coordinate system of the detection device 10. The coordinate system is defined by three Cartesian axes x', y' and z'. The axis z' is designated as the intrinsic vertical axis.

A column 26 extends along the intrinsic vertical axis z', a laser scanner 24 known per se being arranged at the upper end of said column. An environment (not illustrated here) can be detected three-dimensionally geometrically with the aid of such a laser scanner 24. An inertial measurement system 12, likewise known per se, is arranged at the lower end of the column 26, and can be used to determine accelerations in three translation directions and three rotation directions. Situated in the central region of the column 26 is a center console 28, on which a control unit 30 is arranged, which can serve, inter alia, as an interface for inputs by a user. A lever arm 32 having an end point 33 extends from the center console 28 in the positive y'-direction. Moreover, two laser distance measuring devices 20 are arranged on the center console 28, of which laser distance measuring devices one faces in the positive x'-direction (not discernible here) and another faces in the negative x'-direction.

Figures 2A, 2B:
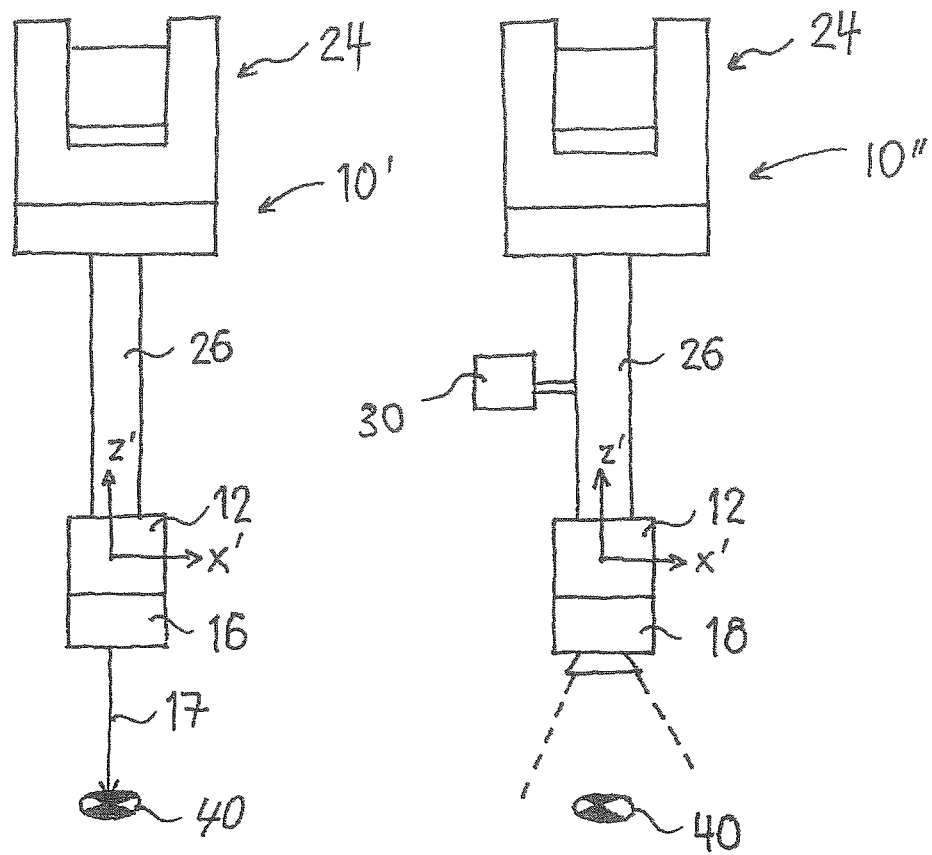
FIG. 2a to c show three further embodiments of detection devices according to the invention.
Figure 2C:
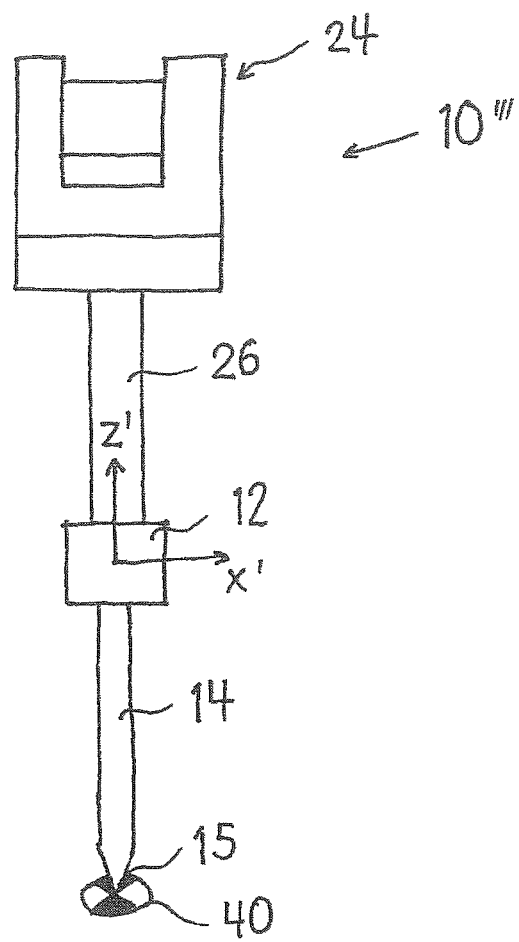

FIGS. 2a to 2c schematically show three possible variants of detection devices 10', 10", 10'" which can be used to facilitate a positioning and/or orienting and/or which can be used to determine a relative coordinate.

The detection device 10' in accordance with FIG. 2a comprises a laser 16 below the inertial measurement system 12, which laser can emit a laser beam 17. The laser 16 is arranged in such a way that the laser beam 17 runs along the intrinsic vertical axis z' of the detection device 10. If a user has directed said laser beam 17 onto a reference point 40, then at this point in time the reference point 40 lies on the intrinsic vertical axis z'. The reference point 40 can be applied on a floor, for example. If the user additionally ensures (for example using inclination sensors which the detection device 10' can likewise comprise) that the intrinsic vertical axis z' runs vertically (i.e. parallel to the direction of the gravitational force), then the referential point 34 of the detection device 10 is positioned exactly vertically above the reference point 40. Proceeding from this, with the aid of the method according to the invention, firstly an error variable can be determined in step b) and a correction of the trajectory 50 provisionally computationally determined by the inertial measurement system 12 can subsequently be carried out in step c). The calculation can be effected with the aid of computation means (not illustrated here), which can be arranged in the center console 28, for instance. In a departure from the above description, the intrinsic vertical axis z' need not necessarily be aligned vertically; instead, with the aid of the inertial measurement system 12 and/or at least one inclination sensor, an orientation of the detection device 10' can be determined and correspondingly taken into account computationally when determining the error variable.

In order at the same time also to determine the height of the referential point 34 above the reference point (that is to say a further relative coordinate), a laser 16 can also be provided, which laser affords a possibility for distance measurement.

FIG. 2b shows a further embodiment of a detection device 10" according to the invention, in which a CCD camera 18 is arranged at the lower end of the column 26. Said CCD camera 18 is directed downwards relative to the intrinsic vertical axis z', such that images of a floor can be captured with the aid of the CCD camera 18. The images captured by the CCD camera 18 can be represented on a screen, which can be part of the control unit 30 illustrated in FIG. 1. A point corresponding to the intrinsic vertical axis z' can additionally be inserted on the screen. As a result, the detection device 10" can be positioned particularly simply in relation to a reference point 40. Moreover, the detection device 10 can be moved along a predefined trajectory taking into account the images generated by the camera 18, as will also be described in detail further below.

The embodiment shown in FIG. 2c contains an, in particular extensible, rod 14 below the inertial measurement system 12. The lower end of said rod 14 forms a contact point 15 that can be brought into contact with a reference point 40. If such contact exists and the distance between contact point 15 and referential point 34 of the detection device is known, then the distance between the referential point 34 and the reference point 40 is also defined. This, too, therefore allows an accurate positioning of the detection device 10"' in which the intrinsic axis z' of the detection device 10"' runs through the reference point 40.

Analogously, the end point 33 of the lever arm 32 shown in FIG. 1 can also be used as a contact point. A horizontal distance between the referential point 34 and a wall, for example, can thereby be set, as will also be explained further below in connection with FIG. 9.

FIGS. 3a, 3b, 4a, 4b and 5 illustrate in various examples how a calibration can be carried out with the aid of the method according to the invention.

Figure 3A:
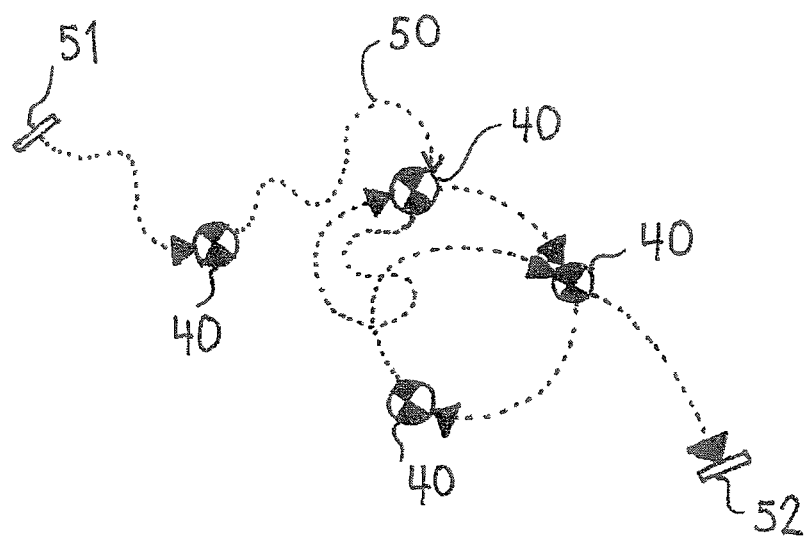
FIGS. 3a and b show two possible trajectories along which a detection device can be moved.

In accordance with FIG. 3a, a detection device (for example one as illustrated in FIG. 1 or FIGS. 2a to 2c) is moved from a start point 51 along a trajectory 50 to a target point 52. FIG. 3a reproduces a schematic plan view of the floor of a production facility. Four reference points 40 are arranged on said floor, the coordinates of said reference points being known (for example Cartesian coordinates). Some of the reference points 40 are reached only once during the movement along the trajectory 50, while other reference points 40 are reached a number of times. Each time one of the reference points 40 is reached, the detection device is brought to rest and positioned in this case such that the referential point 34 of the detection device lies exactly vertically above said reference point 40. This positioning can be realized and controlled for example with the aid of a laser 16, a camera 18 or a contact point 15, as has been described in detail above in connection with FIGS. 2a to 2c.

Subsequently, at this point in time of rest, an error variable is determined which characterizes the deviation of the known absolute coordinates of the respective reference point 40 from the coordinates provisionally computationally determined by the inertial measurement system 12. The error variable can be determined by means of a Kalman filter. The point in time of rest at which the error variable is determined can be input manually by the user, for example via the control unit 30 of the detection device 10 in accordance with FIG. 1. Alternatively, the point in time of rest can also be determined as a point in time at which the velocity and angular velocity calculated by the inertial measurement system 12 are zero or at least below predefined threshold values.

Afterwards, the provisionally computationally determined trajectory 50 is correspondingly corrected if the error variable exceeds a predefined threshold value. This therefore allows a recalibration of the provisionally computationally determined trajectory 50.

The reference points 40 need not necessarily be indexed, that is to say in particular need not bear any unique numbering or coding whatsoever, but rather can be identical to one another, as is illustrated in FIG. 3a. At the point in time of rest, the relative coordinate and the associated error variable can then be determined simultaneously for each of the reference points 40. In this regard, therefore, by way of example, it is possible to determine the distances with respect to each of the reference pints 40, said distances being projected onto a horizontal plane. The trajectory 50 provisionally computationally determined by the inertial measurement system 12 can then be corrected in such a way that the provisionally computationally determined position of the detection device is replaced, at the point in time of rest, by the position of the reference point 40 whose position lies closest to the provisionally computationally determined position of the detection device.

Figure 3B:
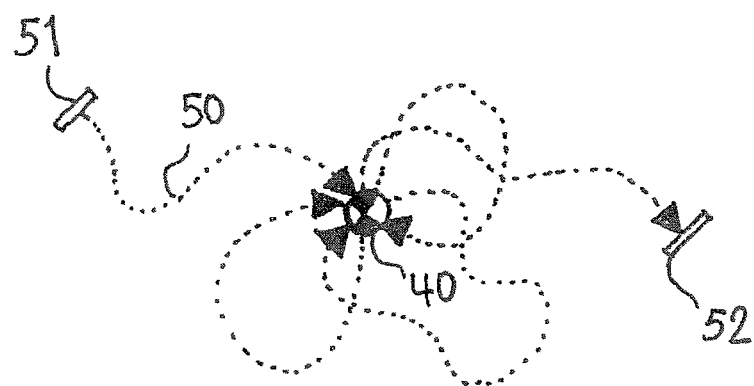

FIG. 3b shows an example in which the absolute coordinates of a reference point 40 do not have to be known. The reference point 40 can for example also be just a temporary marking applied, for instance, as an adhesive label on a floor. In this example, the detection device is guided over this reference point 40 four times in total during the movement along the trajectory 50 from the start point 51 to the target point 52. If the provisional computational determination by the inertial measurement system 12 produces different positions upon these four crossings, then this can be used for correcting the computationally determined trajectory 50.

Figure 4A:
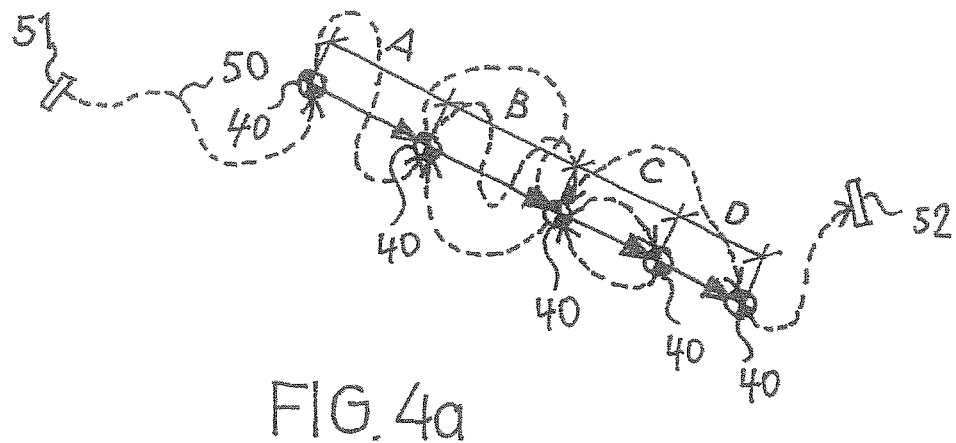
FIGS. 4a and b show two trajectories with rectilinear reference line segments along which a detection device can be moved.

In the example shown in FIG. 4a, five reference points 40 lie on a common reference line segment 42. The distances A, B, C, D between respectively adjacent reference points 40 are known; however, the absolute coordinates of the reference pint 40 need not necessarily be known. The reference points 40 can be defined, for example, by a periodic pattern (not illustrated here) of a floor covering. The detection device is once again moved along the trajectory 50 from the start point 51 to the target point 52, each of the reference points 40 being crossed at least once. If, for example, during the movement from the first reference point 40 to the second reference point 40, the inertial measurement system 12 yields a distance between these two points A' that deviates from the actual distance A, then the provisionally computationally determined trajectory can be correspondingly corrected. In a departure from FIG. 4a it is also possible, of course, for the trajectory 50 to pass through only some of the reference points 40. The more different reference points 40 the trajectory passes through and the more frequently this occurs, the more accurate the calibration becomes.

Figure 4B:
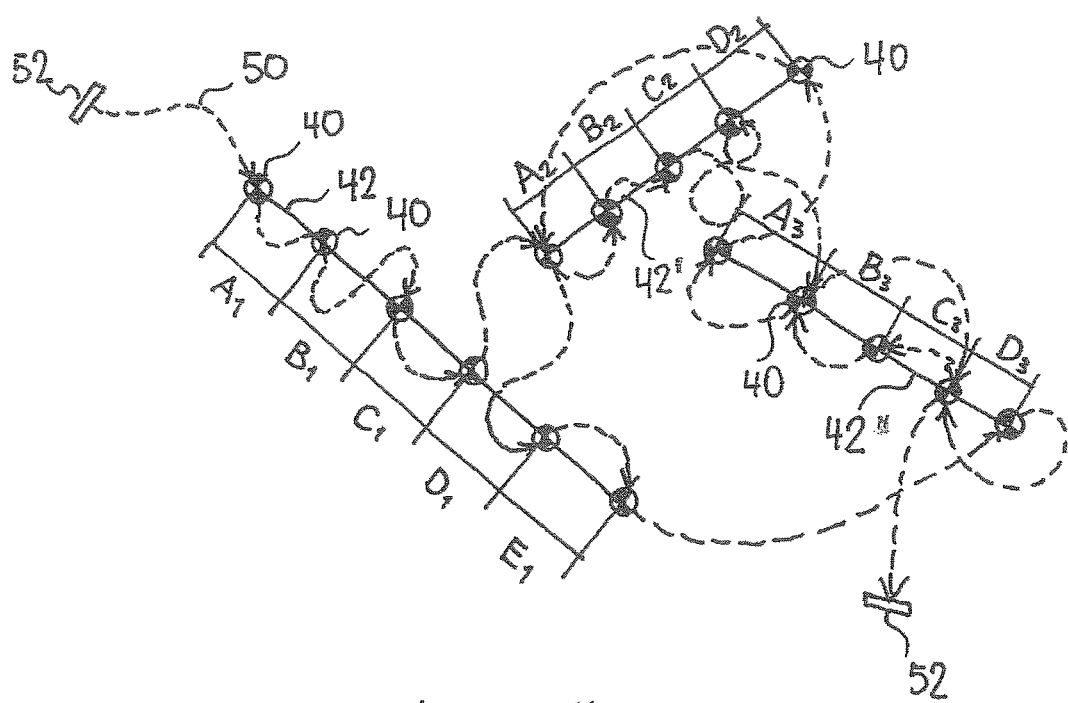

FIG. 4b shows a further variant, in which a total of 16 reference points 40 lie on three reference line segments 42, 42', 42" that are not parallel to one another in pairs. The distances A1, B1, C1, etc. between respectively adjacent reference points 40 on one and the same reference line segment 42, 42', 42" are known; however, knowledge of the absolute coordinates of the reference point 40 is not absolutely necessary. The trajectory 50 from the start point 51 to the target point 52 passes through each of the reference points 40 at least once. As can be gathered from FIG. 4b, in this case the trajectory can also pass through reference points 40 of the different reference line segments 42, 42', 42" alternately. On the basis of the knowledge that individual subsets of the reference points 40 lie on one and the same reference line segment 42, 42', 42", a trajectory provisionally computationally determined by the inertial measurement system 12 can be corrected.

Figure 5:
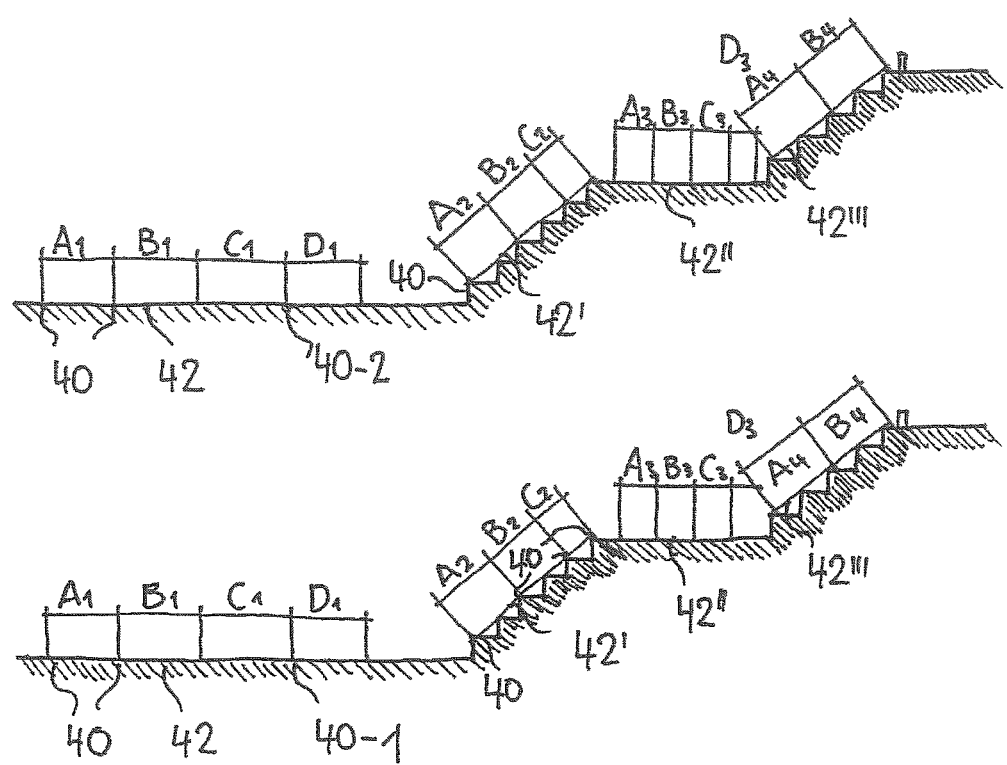
FIG. 5 shows a further trajectory with rectilinear reference line segments along which a detection device can be moved.

FIG. 5 shows a side view of a stairwell with a plurality of storeys lying one above another. Here individual subsets of reference points 40, 40-1, 40-2 likewise lie on common reference line segments 42, 42', 42", 42"'. The two reference line segments 42' and 42"' are inclined, their reference points 40 in each case being formed by the leading edges of a plurality of steps of a respective staircase. Here, too, the distances A1, B1, etc. between respectively adjacent reference points 40 on one and the same reference line segment 42, 42', 42" and 42'" are known. The reference points 40-1 and 40-2 lie exactly vertically one above another. Their projections onto a horizontal plane therefore have the same absolute Cartesian coordinates. The knowledge of this information can likewise be used to determine an error variable and, if appropriate, to correct a provisionally computationally determined trajectory.

Figure 6A:
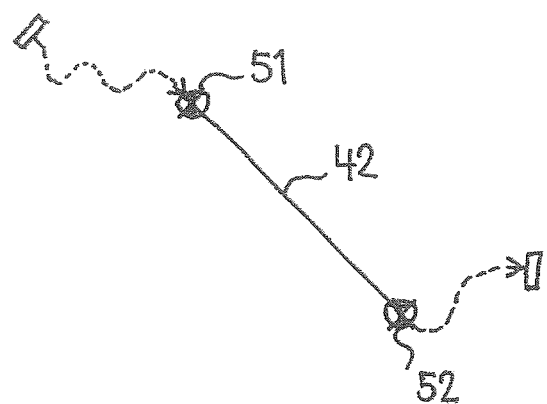
FIGS. 6a and b show two further trajectories along which a detection device can be moved.
Figure 6B:
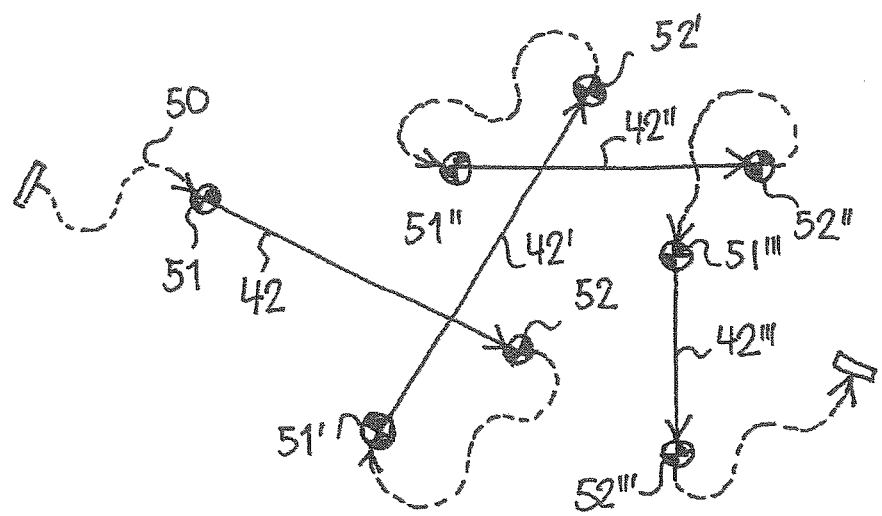

FIGS. 6a and 6b illustrate how a detection device can be moved along a predefined trajectory 50. Said predefined trajectory 50 consists of one reference line segment 42. Said reference line segment 42 can be defined by a straight line which is marked on a floor, but the absolute coordinates of which need not necessarily be known. At a start point 51, the user notifies the detection device (for example by inputting via an interface) that starting from now said user will guide the detection device along the reference line segment 42 to a target point 52 as accurately as is possible for said user. In order to facilitate this, a laser beam 17 emitted by a laser 16 of the detection device can be guided along the line (see FIG. 2a), the line can be tracked with the aid of a camera 18 and a screen (see FIG. 2b), or a contact point 15 can be guided along the line (see FIG. 2c). On the basis of the information that the detection device is guided along a straight line, the provisionally computationally determined trajectory can once again be corrected if the inertial measurement system 12 does not ascertain such a straight line.

In a continuation of FIG. 6a, FIG. 6b shows a trajectory 50 comprising four reference line segments 42, 42', 42", 42'" having respective start points 51, 51', 51", 51'" and target points 52, 52', 52", 52'". The absolute coordinates of the start points 51, 51', 51", 51'" and target points 52, 52', 52", 52'" and also the lengths of the reference line segments 42, 42', 42", 42'" need not necessarily be known. As can be gathered from the illustration, these four reference line segments 42, 42', 42", 42'" are not parallel to one another in pairs, and crossings of the reference line segments also occur in some instances. At the start point 51, 51', 51", 51'" of each reference line segment 42, 42', 42", 42'", the user notifies the detection device that said user will now move said detection device along a straight line, and at the target point 52, 52', 52", 52'" said user indicates that the end of the straight line has been reached. Analogously to the trajectory 50 illustrated in FIG. 6a, the trajectory provisionally computationally determined by the inertial measurement system 12 can be corrected by this means, too.

Figure 7A:
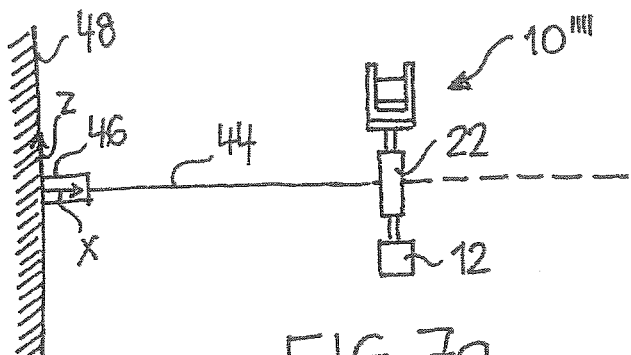
FIGS. 7a and b show an arrangement for position determination with the aid of a laser beam.

FIG. 7a illustrates in a side view how a reference line segment can be defined with the aid of a reference laser beam 44. The reference laser beam 44 is emitted by a laser 46, which in this example is fixedly mounted on a wall 48. It is horizontally aligned and runs along a positionally fixed x-axis, as a result of which it defines a referential height in relation to a z-axis. The detection device 10"" illustrated here has a 360° laser detector 22. On the basis of the detection of the reference laser beam 44, it is possible to determine the relative position and/or orientation of the detection device 10"" with respect to the reference laser beam 44. In particular, it is possible to determine the distance between the reference laser beam 44 and the intrinsic vertical axis z' of the detection device 10"". In addition, the laser detector 22 can be used to determine at what point of the intrinsic vertical axis (that is to say at what z'-value) the reference laser beam 44 impinges. In this way, a constant height of the detection device 10"" can be ensured by corresponding movement of the detection device 10"" by the user or, upon deviation from the referential height, a height difference can be determined and used for correcting the computationally determined trajectory.

As an alternative or in addition to the laser detector 22, the detection device 10"" can also contain at least one reflector (not illustrated here). If the reference laser beam 44 impinges on such a reflector, then this can easily be recognized by the user. This likewise facilitates compliance with the predefined referential height.

The laser 46 can also comprise a distance measuring device, which can be used to ascertain the distance with respect to the laser detector 22 and/or with respect to a reflector and thus with respect to the detection device 10"". The distance measuring device can comprise a rotating deflection unit in a manner known per se. In this way, the trajectory provisionally determined by the inertial measurement system 12 can likewise be corrected by the method according to the invention. This can take place in particular at the points in time at which the reference laser beam 44 impinges on the laser detector 22 and/or a reflector.

In the case of a height difference determined, the synchronization is effected with the aid of the laser detector 22 and/or a reflector. A possible height difference can be determined directly with the aid of the laser detector 22. If not only the height but also the horizontal position of the laser detector 22 is determined with the aid of the laser 46, then an additional data transfer unit can be provided for this purpose in order to enable a real-time evaluation.

In a departure from the embodiment illustrated in FIG. 7a, the laser 46 can also be portable, of course. If the coordinates of the reference laser beam 44 emitted by said laser are known, then this information can be used for correcting the provisionally computationally determined trajectory. However, even if the absolute coordinates of the reference laser beam are not known, the latter can nevertheless define a reference line segment, as will be explained further below in connection with FIG. 8.

Figure 7B:
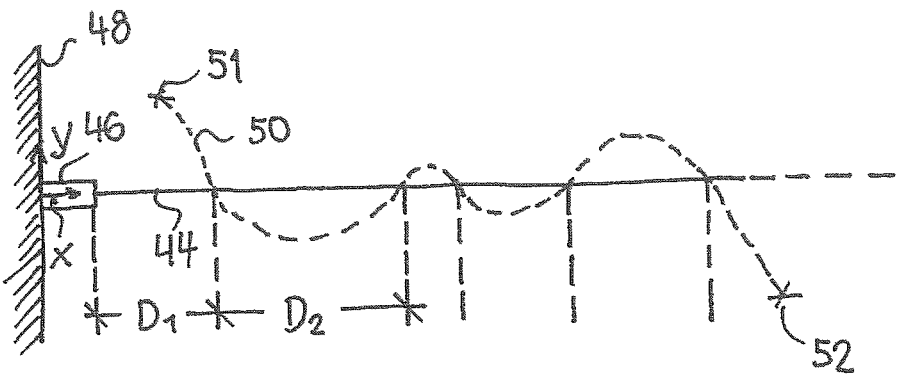

FIG. 7b shows a plan view of the arrangement in accordance with FIG. 7a. The detection device (not illustrated here) is moved along a trajectory 50. Each time when the detection device passes through the reference laser beam 44, this is registered by the laser detector 22 and can serve for correcting the trajectory provisionally calculated by the inertial measurement system 12. The passing through the reference laser beam 44 can be communicated to the user acoustically and/or optically. The distances $D_1$ and $D_2$ are likewise determined with the aid of the laser 46. In this case, too, a data transfer of the distances thus ascertained can be effected.

Figure 8:
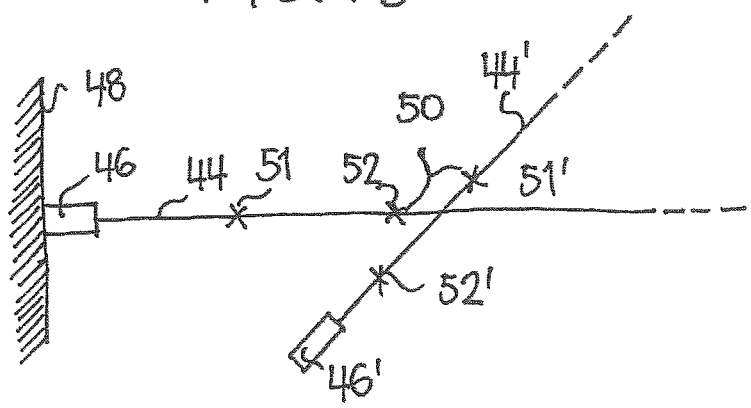
FIG. 8 shows an arrangement for position determination with the aid of two laser beams.

FIG. 8 shows in a plan view how two reference laser beams 44, 44' can be generated with the aid of a first, fixedly installed laser 46 and a second, portable laser 46'. In a manner similar to that shown in FIG. 6b, a detection device can be moved along a trajectory 50, which runs firstly from a first start point 51 along the first reference laser beam 44 to a first target point 52, then on a non-defined trajectory to a second start point 51' on the second reference laser beam 44' and subsequently along said second reference laser beam 44' to a second target point 52'. The user can input, via a control unit, when said user reaches the first start point 51, the first target point 52, the second start point 51' and the second target point 52'. A correction of the trajectory provisionally determined by the inertial measurement system 12 can likewise be achieved from this.

Figure 9:
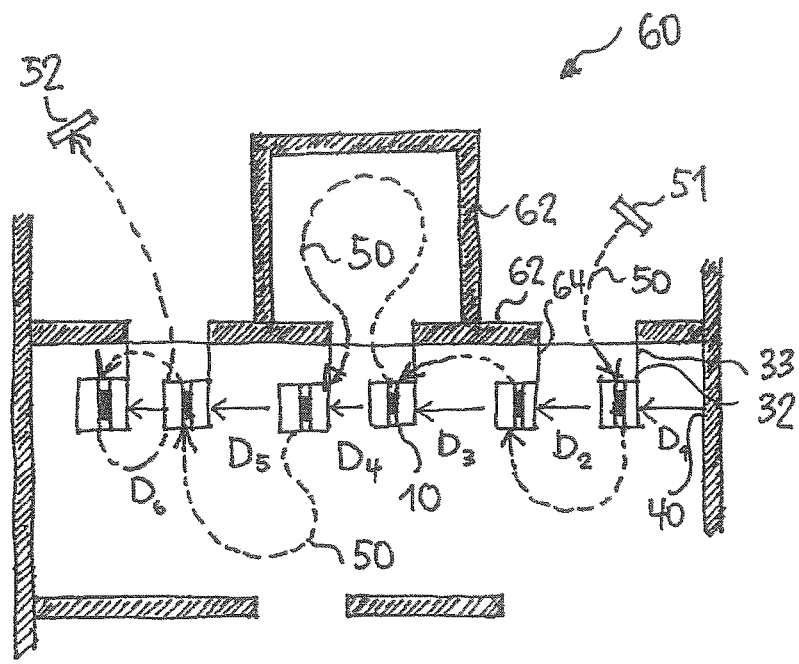
FIG. 9 shows a further trajectory along which a detection device can be moved.

FIG. 9 shows in a plan view how the detection device 10 in accordance with FIG. 1 can be used in an environment 60 containing a multiplicity of walls 62. The detection device 10 is moved from a start point 51 along a trajectory 50 to a target point 52. At various points of the trajectory 50, the end point 33 of the lever arm 32 is brought into contact with edges 64 of the walls 62, said edges 64 forming reference points of the environment 60. If the absolute coordinates of the edges 64 are known, then the trajectory provisionally determined by the inertial measurement system 12 can be correspondingly corrected on this basis. With the aid of the laser distance measuring devices 20 (see FIG. 1), the distance with respect to a reference point 40 at one of the walls 62 can be determined at the same locations of the trajectory 50. On the basis thereof, too, the provisionally determined trajectory can be corrected, if appropriate. The more frequently contact is established between the end point 33 of the lever arm 32 and the edges 64 of the walls 62 and the more frequently the distance with respect to the reference point 40 is determined, the more precisely the trajectory 50 can be determined.

Figure 10:
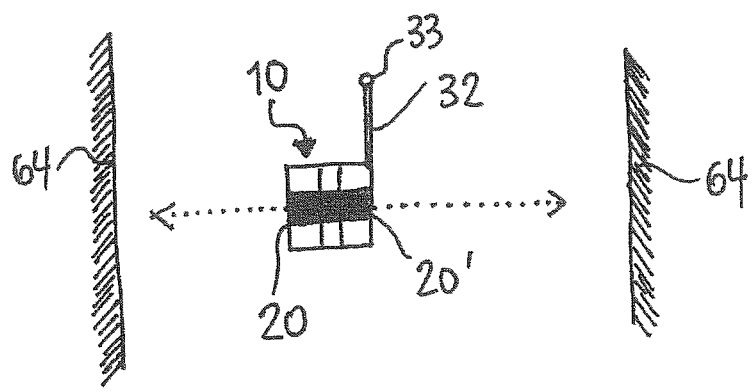
FIG. 10 shows a detection device comprising two laser distance measuring devices.

FIG. 10 shows in a further plan view how the distances with respect to two opposite walls 64, 64' can be determined with the aid of two oppositely arranged laser distance measuring devices 20. An even more accurate correction of the trajectory is possible as a result.

Figure 11:
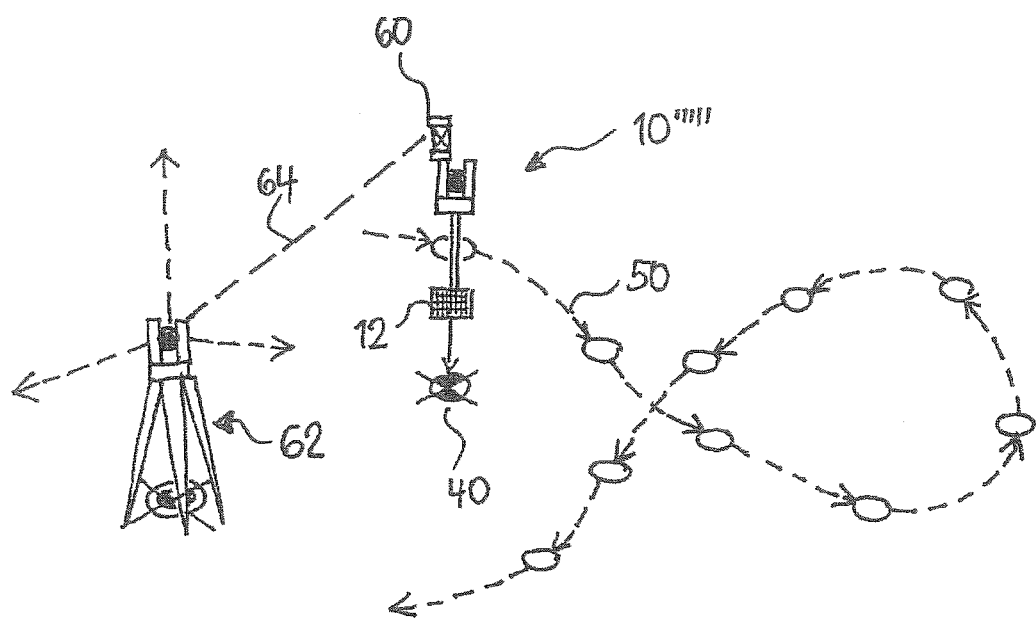
FIG. 11 shows a detection device comprising a round prism.

FIG. 11 schematically illustrates a detection device 10'''' comprising an inertial measurement system 12 and a retroreflector in the form of a round prism 60. The round prism 60 can be, for instance, the model GRZ4 obtainable from Leica Geosystems AG, CH-8152 Glattbrugg. A target-tracking tachymeter 62 emits a light beam 64 that is reflected from the round prism 60 to the tachymeter 62. As a result, the position of the detection device 10'''' can be determined in a manner known per se. Preferably, this determination takes place at a point in time of rest of the detection device 10'''' at which said detection device rests above a reference point 40. On the basis of this determination, the trajectory provisionally computationally determined by the inertial measurement system 12 can then be corrected, if appropriate.

We claim:

1. A method for calibrating a detection device comprising a laser scanner which is designed for three-dimensional geometrical detection of an environment and which comprises at least one inertial measurement system, the method comprises the following steps:
   with the inertial measurement system, provisionally computationally determining a trajectory of the detection device by time-dependently determining a position and an orientation of the detection device relative to the environment,
   positioning the detection device at multiple reference points, wherein each positioning of the detection device constitutes a point in time of rest, wherein each reference point is
   (i) predefined and the detection device is positioned at the known reference point at the point in time of rest, or
   (II) initially undefined but defined by a tachymeter and an on-board retroreflector determining a position of the detection device at the point in time of rest,
   for each position provisionally computationally determined by the inertial measurement system at a point in time of rest, determining multiple error variables which in each case characterize a deviation of a position of a reference point from the respective provisionally computationally determined position; and
   correcting the trajectory provisionally computationally determined by the inertial measurement system in such a way that each position of the detection device provisionally computationally determined at a point in time of rest is substituted by a position that corresponds to a reference point, for which the error variable is the smallest.

2. The method according to claim 1, wherein a point in time of rest is determined either:
   by the inertial measurement system at a point in time at which linear velocity and angular velocity of the detection device are either zero or at least below predefined threshold values, or
   manually by a user via an interface comprised by the detection device if the user has brought the detection device to rest.

3. The method according to claim 1, wherein for positioning at least one of the following steps is performed:
   effecting a mechanical contact between a contact point of the detection device with a reference point,
   directing a light beam emitted by the detection device onto a reference point, and
   directing a camera at a reference point.

4. The method according to claim 1, wherein at least one position of a reference point is determined optically, with aid of at least one laser distance measuring device.

5. The method according to claim 1, wherein at least one absolute coordinate of a position of at least one reference point is known and is used when determining the error variable.

6. The method according to claim 1, wherein at least one relative coordinate which characterizes the relative position of at least two reference points with respect to one another is known and is used when determining the error variable.

7. The method according to claim 1, wherein at least three different reference points lie on a common reference line segment.

8. The method according to claim 7, wherein at least one reference line segment is defined by a reference laser beam.

9. The method according to claim 8, wherein the reference laser beam is detected with aid of a laser detector.

10. The method according to claim 1, wherein a plurality of reference points He on a predefined trajectory, the detection device is moved along the predefined trajectory and the error variables are determined from the deviation of the trajectory provisionally computationally determined by the inertial measurement system from the predefined trajectory.

11. The method for calibrating a detection device according to claim 1, wherein device calibration is independent of any global navigational signals, including GPS.

12. A detection device for three-dimensional geometrical detection of an environment, the detection device comprising:
   a laser scanner,
   t least one inertial measurement system configured for provisionally computationally determining a trajectory of the detection device by time-dependently determining position and orientation of the detection device relative to the environment, and a computer,
   wherein the detection device is configured for being positioned at multiple reference points,
   wherein each positioning of the detection device constitutes a point in time of rest, wherein each reference point is
   (i) predefined and the detection device is positioned at the known reference point at the point in time of rest, or (ii) initially undefined but defined by a tachymeter determining a position of the detection device at the point in time of rest, and wherein the computer is configured for for each position provisionally computationally determined by the inertial measurement system at a point in time of rest, determining multiple error variables which in each case characterize a deviation of a position of a reference point from the respective provisionally computationally determined position; and correcting the trajectory provisionally computationally determined by the inertial measurement system in such a way that each position of the detection device provisionally computationally determined at a point in time of rest is substituted by a position that corresponds to a reference point, for which the error variable is the smallest.

13. The detection device according to claim 12, wherein at least one of:

the inertial measurement system is configured for determining a point in time of rest at a point in time at which the linear velocity and the angular velocity of the detection device are either zero or at least below a predefined threshold value; and the detection device comprises an interface for allowing a user to manually notify the detection device if said user has brought the detection device to rest.

14. The detection device according to claim 12, wherein at least one of:

the detection device comprises a contact point configured for effecting a mechanical contact between the contact point and a reference point, the detection device is configured for emitting a light beam for being directed onto a reference point, and the detection device comprises a camera for being directed at a reference point.

15. The detection device for three-dimensional geometrical detection of an environment according to claim 12, wherein device calibration is independent of any global navigational signals, including GPS.

16. A system comprising a detection device, for three-dimensional geometrical detection of an environment, and a tachymeter, the detection device comprising:

a laser scanner, at least one inertial measurement system configured for provisionally computationally determining a trajectory of the detection device by time-dependently determining position and orientation of the detection device relative to the environment, a retroreflector, and a computer, wherein the detection device is configured for being positioned at multiple reference points, wherein each positioning of the detection device constitutes a point in time of rest. wherein each reference point is (i) predefined and the detection device is positioned at the known reference point at the point in time of rest, or (ii) initially undefined but defined by the tachymeter and the retroreflector determining a position of the detection device at the point in time of rest, wherein the retroreflector is configured for rendering the position of the reference points determinable in interaction with the tachymeter by a light beam transmitted by the tachymeter and reflected from the retroreflector of the detection device back to the tachymeter, and wherein the computer is configured for for each position provisionally computationally determined by the inertial measurement system at a point in time of rest, determining multiple error variables which in each case characterize a deviation of a position of a reference point from the respective provisionally computationally determined position; and correcting the trajectory provisionally computationally determined by the inertial measurement system in such a way that each position of the detection device provisionally computationally determined at a point in time of rest is substituted by a position that corresponds to a reference point, for which the error variable is the smallest.

17. The system comprising a detection device, for three-dimensional geometrical detection of an environment according to claim 16, wherein device calibration is independent of any global navigational signals, including GPS.

* * * * *